Patented May 22, 1945

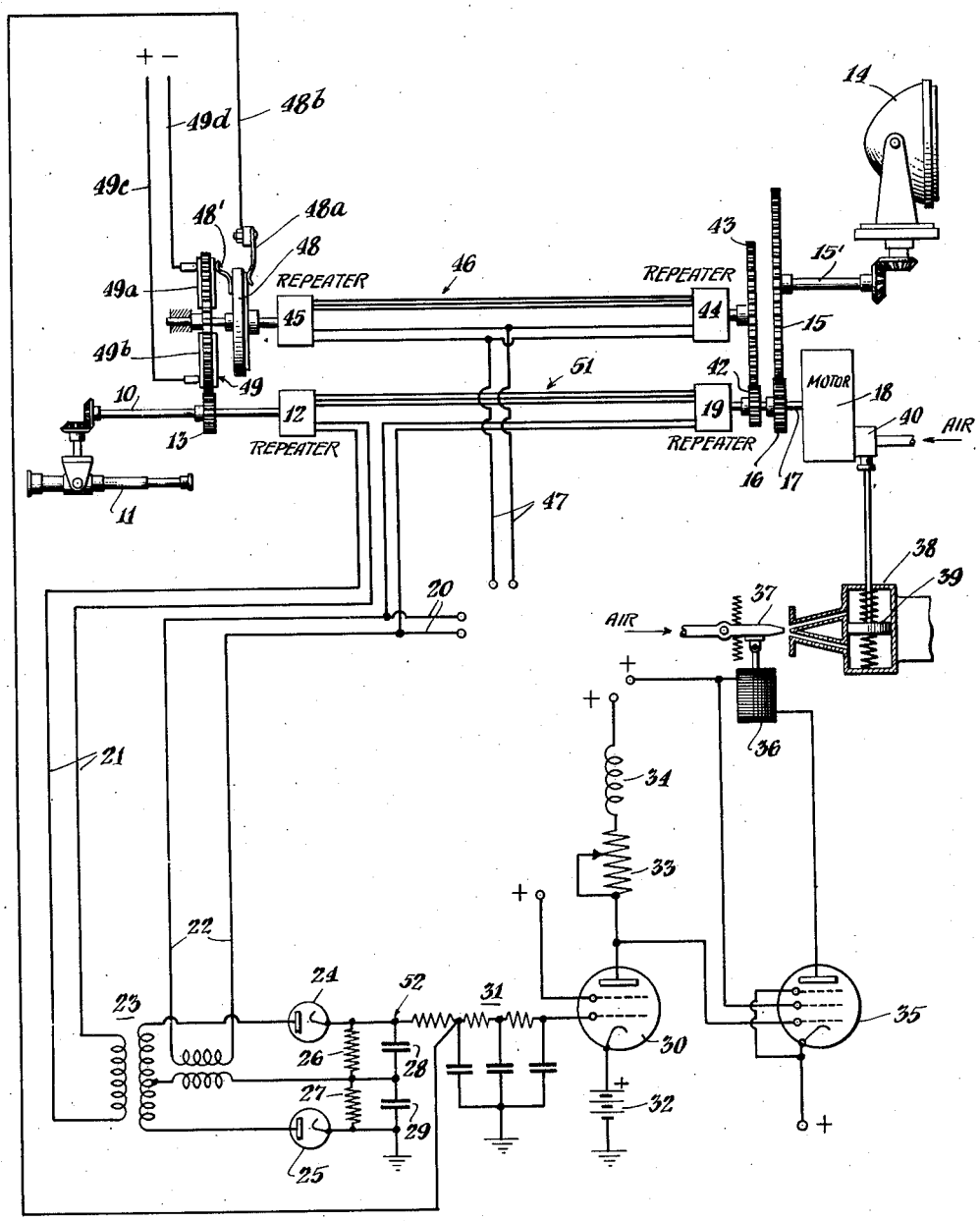

2,376,359

UNITED STATES PATENT OFFICE 2,376,359

REMOTE CONTROL SYSTEM

Rune Hultin, Lidingo, Sweden, assignor to Aga-Baltic Aktiebolag, Stockholm, Sweden, a corporation of Sweden Application June 30, 1942, Serial No. 449,202
In Sweden March 5, 1942

4 Claims. (Cl. 121—41)

My invention relates to pressure operated remote control systems.

Pressure operated remote control systems have the advantage that large amounts of power may be obtained by using a source of power (gas accumulator or the like) which occupies a rather small space and is easy to transport. Therefore they are specially suitable for such mobile purposes as military control systems, for instance for orienting guns, search-lights and the like, although they are also useful in connection with stationary objects which are to be controlled remotely. Previous systems of this type did not effect sufficient control precision and furthermore they were usually too complicated and consequently subject to errors of various kinds. The use of such systems was thus limited to cases where only low precision was required and where reliability was not essential.

The present invention relates to a pneumatic remote control system which operates with high precision and which is simple and reliable. In the arrangement according to the present invention certain electrically controlled means are used, but these are without exception of a kind which require only little power, and for which the required power can easily be produced locally, if necessary.

According to the present invention electrically coupled repeater devices are used in the transmitter and in the receiver. Such devices may comprise threephase-singlephase wound rotating transformers or other devices in which any error in position between the transmitter device and the receiver device is indicated by a voltage at the output terminals of one of the repeater devices. According to the invention this voltage is fed to a T-transformer and produces a controlled direct current voltage which actuates a relay controlling the pressure operated motor. Further details of the invention will be apparent from the following description, taken in connection with the drawing in which the figure is a diagrammatic representation of a system embodying the present invention.

In the figure a shaft 10 is coupled with the device 11 at the transmitter, which may for instance comprise a telescope or the like, the angular movement of which is to be transmitted. On the shaft 10 is mounted a repeater 12. The shaft 10 also carries a gear 13 the purpose of which will be further described.

The device at the receiver, which may for instance comprise a military piece such as a gun or search-light to be controlled, is indicated at 14. The piece 14 is controlled by means of a gear 15 carried on the shaft 15' of the piece 14 and meshing with a gear 16 mounted on a shaft 17 which is driven by the pressure actuated motor 18. On the shaft 17 there is also mounted a repeater 19 which is electrically coupled to the repeater 12. In the embodiment shown the repeaters are assumed to consist of a three-phase stator and a single-phase rotor. The single-phase winding of the repeater 19 is fed from mains 20 with alternating current, preferably of a rather high frequency. There will be induced in the single-phase rotor-part of the repeater 12 a voltage the magnitude of which is a function of the angular position of the rotor in question in relation to the stator. The single-phase current thus induced is fed by means of a line 21 to a T-coupled transformer 23, one winding of which is fed by means of a line 22 from the mains 20. The two voltages are algebraically added in the transformer 23 and the resultant is fed to a pair of opposed rectifiers 24, 25, working into load resistors 26, 27 which are shunted for alternating current by means of condensers 28, 29. The resistors 26, 27 are connected in series. One end of the resistors is grounded, whereas the other end is connected with the control grid of an amplifier tube 30 by a line containing a filter 31 for filtering out any alternating current ripple.

A battery 32 in the cathode lead of the tube 30 forms a self-bias. In the anode lead there are arranged in series a resistor 33 and an inductance coil 34. Finally the anode of the tube 30 is connected to the control grid of another tube 35, the anode lead of which is connected to the winding of a control relay 36 for the pressure control valve. This relay controls a compressed air nozzle 37 to supply air either to the one side or the other side of a piston 39 which is movable in a cylinder 38. The piston 39 is mechanically connected to a valve 40, which is arranged to open a pipe for the supply of fluid under pressure to the motor 18.

On the shaft of the pressure actuated motor 18 is mounted a gear 42 cooperating with a gear 43, carried on the shaft of a repeater 44. This repeater 44 is coupled to a repeater 45 on the transmitter side by means of a three-phase line 46. Both of the repeaters 44 and 45 are fed with alternating current, preferably of a low frequency, from mains 47. The repeaters 44 and 45 therefor will automatically follow each other. The shaft of the repeater 45 is connected to a contact disc 48, carrying a brush 48' which engages contacts 49a or 49b on a second contact disc 49. A brush 48a makes contact with the disc 48. This brush is connected by a line 48b to supply grid bias to the tube 30. Contacts 49a and 49b are connected by lines 49c and 49d to sources of positive and negative potentials respectively. The contact arrangement is arranged in such a way that the brush 48 takes three different positions, viz. a normal position in which no contact is closed, and two outer positions in which either of the contacts 49a or 49b are closed to supply two different biases to the control grid of the tube 30.

The arrangement functions in the following manner: Initially there is exactly 90° angular displacement between the rotors in the two repeaters 12 and 19. It should be noted that the repeater 19 obtains its single phase voltage from the terminals 20. This voltage is transferred by transformer action to the three-phase winding of the repeater 19. There actually is no three-phase current produced in this winding, but the three winding parts will carry voltages which, when added algebraically, correspond to the single-phase voltage impressed from the terminals 20 multiplied by a conversion ratio. These voltages are transferred over the three conductors 51 to the repeater 12, and produce a field in the repeater 12 which fully corresponds to the field which is produced in the repeater 19 by the voltage impressed at the terminals 20. If the single-phase winding in the repeater 12 is perpendicular to the field direction no voltage is induced in this single-phase winding, and both of the repeaters are than regarded as in corresponding positions.

The same voltage is impressed on both of the rectifiers 24 and 25 by the conductors 22, thus producing equal and opposite D. C. voltages across the resistors 26 and 27. The point 52 will therefore be at earth potential.

If the transmitter 11 is turned without a corresponding movement of the receiver 14, the single-phase winding in the repeater 12 will no longer be perpendicular to the direction of the field due to the three-phase winding of the repeater 12. Consequently a voltage will be induced in the transformer 23 which, for instance, is added to the voltage applied to the rectifier 24 from the conductors 22 and subtracted from the voltage applied to the rectifier 25 from the conductors 22 (or vice versa). In this case the direct current voltage drop across the resistance 26 is increased and the direct current voltage drop across the resistance 27 is decreased by the same amount. The voltage at the point 52 will thus be displaced in a positive or in a negative direction from the ground potential, dependent upon the direction of movement of the single-phase winding of the reheater 12 from its normal position. The direct current voltage at the point 52 produces a pure direct current amplification in the electronic tubes 30 and 35 and energizes the relay winding 36 to cause a corresponding displacement of the nozzle 37. Air under pressure is impressed either above or below the piston 39 in the cylinder 38 to actuate the valve 40 in a direction to cause the motor 18 to rotate the receiver 14, and also the repeater 19 in such a way that the field of the three-phase winding in the repeater 12 is turned. The voltage across the conductors 21 then becomes zero and the arrangement comes to rest.

However, the receiver 14, the motor 12 and the parts 15, 16, 17, and 19 may have a total mass which is so great that hunting develops. In order of avoiding this hunting movement the resistance 33 and inductance coil 34 are connected in the anode circuit of the tube 30. It is known that hunting movement can be prevented by applying to the alignment motor a force proportional to the sum of the magnitude of control movement and the first derivative of the control movement. The voltage drop produced in the resistance 33 in the present case is a function of the control movement and the voltage drop across the inductance coil 34 is a function of the first derivative of the control movement. Consequently the movement of the motor 18 may be made fully free from hunting if the resistance 33 and the inductance 34 are made of the correct value. The correct relation between these values will be dependent upon the masses which are put in movement by the motor 18, and it is therefore preferable to make the resistance 33 adjustable so that the correct relation between the resistance 33 and the inductance 34 may be obtained before the system is put in use.

The movement of the motor 18 is transferred by means of the shaft 17 and the gears 42, 43 to a second repeater 44. This is electrically connected with the repeater 45 on the transmitter side. However, as the load of the repeater 45 on the transmitter side is very small, viz. only the disc 48, the magnetic force of the repeater is sufficient for controlling the disc 48 with the desired precision.

Hence it is sufficient to connect the single-phase windings in the two repeaters to a source of alternating current 47 and to connect the three-phase windings of both of the repeaters by means of a three-phase line 46. The repeater 45 then will follow the movement of the repeater 44. The disc 48 is used for obtaining a follow-up signal, that is, to give a visual indication on the transmitter side that the movement of the transmitter 11 is followed by the receiver 14. It is also used for automatic control. In the case of large movements of the transmitter 11 corresponding to more than half a turn of the repeaters 12 and 19, an error in movement may be introduced between the transmitter 11 and the receiver 14 with the single-phase winding of the repeater 12 extending perpendicularly to the field direction but 180° displaced from its correct position. However, this error in position will also be present between the discs 48 and 49, and will close one of the two contracts 49a, 49b, dependent upon whether this error in position is positive or negative. The control grid of the electronic tube 30 is thus fed with a voltage which is either negative or positive in relation to ground. This voltage is isolated from ground and the resistances 26, 27 by means of the first resistance in the filter arrangement 31.

The result of this connection will be that the current through the winding 36 becomes either stronger or weaker than the normal current and the nozzle 37 is shifted to introduce air either above or below the piston 39 in the cylinder 38 until the motor 18 corrects the error in position between the discs 48 and 49 and opens the contact 49a or 49b. The final fine control of the receiver 14 then takes place in the above mentioned manner.

Of course the invention is not limited to the above embodiment but varous modifications may be made therein without departing from the scope of the invention.

What is claimed:

1. A pressure actuated remote control system for causing a remote receiver to follow the movement of a transmitter, comprising electrically coupled repeaters connected respectively to said transmitter and said receiver, means supplying an alternating energizing voltage to one of said repeaters, a differential rectifier, means combining the output voltage of the other repeater and said alternating voltage to obtain a resultant voltage, means supplying said resultant voltage to said rectifier to obtain therefrom a D. C. voltage having a direction and a value which is a function of the relative angular displacement of said repeaters, a servo-motor connected to drive said receiver and the repeater connected thereto, an amplifier tube connected to be energized by said D. C. voltage and to supply output energy for controlling the operation of said servo-motor, and means associated with said amplifier tube to introduce voltage drops to develop control forces proportional to the magnitude of the control movement and to the first derivative of the control movement.

2. A pressure actuated remote control system for causing a remote receiver to follow the movement of a transmitter, comprising electrically coupled repeaters connected respectively to said transmitter and said receiver, means supplying an alternating energizing voltage to one of said repeaters, a differential rectifier, means combining the output voltage of the other repeater and said alternating voltage to obtain a resultant voltage, means supplying said resultant voltage to said rectifier to obtain therefrom a D. C. voltage having a direction and a value which is a function of the relative angular displacement of said repeaters, a servo-motor connected to drive said receiver and the repeater connected thereto and an amplifier tube connected to be energized by said D. C. voltage and to supply output energy for controlling the operation of said servo-motor, said amplifier tube having an anode supply circuit and an inductance and a resistance connected in said anode circuit to introduce voltage drops to develop control forces proportional to the magnitude of the control movement and to the first derivative of the control movement, respectively.

3. A pressure actuated remote control system for causing a remote receiver to follow the movement of a transmitter, comprising electrically coupled repeaters connected respectively to said transmitter and said receiver, means supplying an alternating energizing voltage to one of said repeaters, a differential rectifier, means combining the output voltage of the other repeater and said alternating voltage to obtain a resultant voltage, means supplying said resultant voltage to said rectifier to obtain therefrom a D. C. voltage having a direction and a value which is a function of the relative angular displacement of said repeaters, a servo-motor connected to drive said receiver and the repeater connected thereto, a second pair of repeaters connected to indicate at the transmitter the position of the receiver and means at the transmitter actuated by the difference in position between said last repeater and the transmitter, to control said servo-motor independently of said first control, for causing said motor to correct said difference in position.

4. A pressure actuated remote control system for causing a remote receiver to follow the movement of a transmitter, comprising electrically coupled repeaters connected respectively to said transmitter and said receiver, means supplying an alternating energizing voltage to one of said repeaters, a differential rectifier, means combining the output voltage of the other repeater and said alternating voltage to obtain a resultant voltage, means supplying said resultant voltage to said rectifier to obtain therefrom a D. C. voltage having a direction and a value which is a function of the relative angular displacement of said repeaters, a servo-motor connected to drive said receiver and the repeater connected thereto, a second pair of repeaters connected to indicate at the transmitter the position of the receiver and switch means at the transmitter actuated by a difference in position between said last repeater and said transmitter to supply a D. C. voltage to said control means to cause actuation thereof to correct said difference in position.

RUNE HULTIN.